United States Patent
Shida

(10) Patent No.: US 7,590,077 B2
(45) Date of Patent: Sep. 15, 2009

(54) CANCELLER DEVICE AND DATA TRANSMISSION SYSTEM

(75) Inventor: Yasunari Shida, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 809 days.

(21) Appl. No.: 11/303,941

(22) Filed: Dec. 19, 2005

(65) Prior Publication Data

US 2006/0133303 A1    Jun. 22, 2006

(30) Foreign Application Priority Data

Dec. 21, 2004  (JP)  ............... 2004-369687

(51) Int. Cl.
*H04B 3/20* (2006.01)
(52) U.S. Cl. ................... 370/286; 379/406.01
(58) Field of Classification Search ................ 370/201, 370/286; 379/406.01, 406.03, 406.06, 406.09
See application file for complete search history.

(56) References Cited

U.S. PATENT DOCUMENTS 4,400,803 A * 8/1983 Spiess et al. .............. 367/88
5,751,775 A * 5/1998 Fensch et al. ............. 375/371
6,522,282 B1   2/2003 Elbornsson

OTHER PUBLICATIONS

Runsheng, et al., "A DSP Based Receiver for 1000BASE-T PHY," IEEE International Solid State Circuits Conference 19-6, 2001.
Robert Talt, et al., "A 1.8V 1.6GSample/s 8-b Self-Calibrating Folding ADC with 7.26 ENOB at Nyquist Frequency," IEEE International Solid State Circuits Conference 14.1, 2004.

* cited by examiner

*Primary Examiner*—Creighton Smith
(74) *Attorney, Agent, or Firm*—McGinn IP Law Group, PLLC

(57) ABSTRACT

Disclosed is a canceller device comprising a subcanceller for compensating the sampling phase shift of a plurality of analog-to-digital convert circuits for receiving a common input analog signal, converting the analog signal into digital signals responsive to respective sampling clock signals with different phases to each other, and for outputting the digital signals, a main canceller for canceling echo/cross-talk from the signal output from analog-to-digital convert circuits whose the sampling phase shifts have been compensated, and a compensation range selection circuit for determining the range of the sampling phase shift for being compensated by the subcanceller based on the tap coefficients of the main canceller.

18 Claims, 13 Drawing Sheets

TIME (UNIT: UI)

CANCELLER DEVICE AND DATA TRANSMISSION SYSTEM

FIELD OF THE INVENTION

The present invention relates to a data transmission system and particularly a canceller device that cancels echo and/or cross-talk from a received signal.

BACKGROUND OF THE INVENTION

First, the outline of data transmission system will be given. FIG. 2 is a diagram showing a typical configuration of a data transmission system comprising echo cancellers. In FIG. 2, a structural example of a transmission system (full duplex transmission system) using a twisted pair cable is shown as a data transmission system to which a canceller circuit relating to the present invention may also be applied.

Referring to FIG. 2, in a transmission device of this data transmission system, each transmission symbol (digital signal) is converted into an analog signal by digital-to-analog converters 10 and 20, driven out by driver circuits 11 and 21, and transmitted to a transmission line 30 via hybrid circuits 16 and 26, and transformers 17 and 27. A transmission signal sent from the opposite device to the transmission line 30 is received by a receiver device via the transformers 17 and 27, and the hybrid circuits 16 and 26. In the receiver device, after the received analog signal is converted into a digital signal by analog-to-digital converters 12 and 22, the waveform is equalized by waveform equalizers 13 and 23, and then a received symbol is output from identifiers not shown in the drawing. In the transmission line 30, a transmission signal and a received signal are simultaneously and bi-directionally transmitted. An echo occurs when a transmission signal sneaks into a received signal, and it is caused by mismatches among the transformers 17 and 27, and the hybrid circuits 16 and 17, and mismatches between the connectors of the transmission line 30.

The echo cancellers 14 and 24 receive the transmission symbols and error signals obtained by subtractors 15 and 25 which subtract the output of echo cancellers 14 and 24 (echo hereplica) from the output of the analog-to-digital converters 12 and 22 respectively, so that the echo and noise such as near-end cross-talk (NEXT) are cancelled.

As a concrete example of the data transmission system, for instance, "IEEE Standard 802.ab 10000BASE-T" specifies the physical layer (PHY) for Gigabit Ethernet (Registered Trademark) over CAT-5 cabling systems where, for every incoming data byte, a trellis encoder outputs four PAM-5 symbols to four pairs of wires at 125 MBaud/s. Signals are transmitted bi-directionally on each of the four wires (four pairs of the transmission line in FIG. 2), therefore echo must be removed on each wire. In addition, near-end cross-talk (NEXT) from the other wires can also be removed in a way similar to removal of echo cancellation (refer to Non-Patent Document 1: Runsheng, et al., "A DSP Based Receiver for 1000BASE-T PHY," IEEE International Solid State Circuits Conference 19-6, 2001). In Non-Patent Document 1, the configuration of a DSP based receiver for 1000BASE-T physical layer (PHY) shown in FIG. 12 is disclosed. Although a data path shown in FIG. 12 is only for one channel, all four channels have similar structure.

Referring to FIG. 12, a block before a 9-bit pipeline analog-to-digital (A/D) converter 607 includes a hybrid 603, a base-line wander correction circuit 604, a programmable gain stage 605, and an anti-aliasing analog low-pass filter (LPF) 606. The hybrid 603 performs coarse echo cancellation by subtracting a replica of a band-limited waveform from a received waveform. Residual echo is removed by a digital echo canceller (ECHO & NEXT) 610. Since the discrete-time response of echo is sensitive to timing phase of the A/D converter 607, the ECHO & NEXT canceller 610 has jitter noise caused by timing jitter. The LPF 606 reduces the jitter noise by removing the high-frequency component of echo and near-end cross-talk responses. The baseline wander correction circuit 604 removes baseline distortion caused by the low-cut nature (the high-pass nature) of the transformer, and is controlled by a decision directed adaptive loop. A FIFO (First-In First-Out circuit) 608 provides compensation for delay skew on four different wires. The output signals of the A/D converter 607 are written into the FIFO 608 on A/D sampling clocks with different phases for four different channels, and are read on a single clock (that clocks all DSP blocks). Putting the FIFO 608 before the DSP block, resolves the latency skew at the earliest stage, and all DSP blocks operate on the same clock domain. The delay of the FIFO 608 on each channel is found by matching the idle symbol on all four channels during start up. The delay of the FIFO 608 is determined by the maximum delay skew. The digital ECHO & NEXT canceller 610 removes NEXT (near-end cross-talk) as well as the residual echo of the hybrid. The ECHO & NEXT canceller 610 for each channel is implemented by four FIR (Finite Impulse Response) filters (three for NEXT (20×3 taps), one for echo (160 taps)), and local transmitted data (TX data) from an encoder 602 is supplied to the FIR filters. A delay circuit (Delay Adjust) 611 at the input of the ECHO & NEXT canceller 610 matches the path delay from the input of the A/D converter 607 to the output of the FIFO 608. Each tap of the FIR filter in the ECHO & NEXT canceller 610 is adaptive. Since changes of responses are slow compared to the 125 M/s symbol rate, the loop gain of the ECHO & NEXT canceller is set to a small value to reduce gradient noise. A least mean-square (LMS) algorithm is used for adapting taps of the ECHO & NEXT canceller 610. The output (echo and cross-talk replica) of the ECHO & NEXT canceller 610 is subtracted from the output of the FIFO 608, and the result is supplied to a feed-forward equalizer (FFE) 612. The FFE 612 is a filter for canceling the pre-cursor ISI (InterSymbol Interference). The output of the gain stage is fed to a DFSE (Decision Feedback Sequence Estimation) 614. The DFSE 614 implements a trellis code decoder and a DFE (Decision Feedback Estimator). To generate branch metrics of the trellis code decoder, the absolute value of error is used. To compare the gain of the DFSE 614, a 5-level threshold detector is implemented. Digital timing recovery (not shown in the drawing) controls the sampling phases of the A/D converter 607. The digital timing recovery includes a phase loop for each channel and a frequency loop shared by all four channels. Note that reference symbols 615, 616, 617, and 618 indicate error generator, error monitor, adaptation algorithm, and control circuit respectively, however, since they are not directly relevant to the subject of the present invention, explanations of them will be omitted.

FIG. 13 is a diagram illustrating the configuration of the ECHO & NEXT canceller 610 shown in FIG. 12. FIG. 13 is newly created by the present inventor in order to describe the prior art in more detail. As shown in FIG. 13, it comprises an echo canceller 702 (for instance a 160 tap FIR filter) which receives a transmission symbol pair 1 and a residual echo and outputs an echo replica, and three NEXT canceller circuits 703, 704, and 705 (20 tap FIR filters). Out of four pairs of twisted pair cables, an echo error signal from a twisted pair 1, near-end cross-talk from a twisted pair 2, near-end cross-talk from a twisted pair 3, and near-end cross-talk from a twisted pair 4 are sneaked into an input signal pair 1 from the twisted pair 1. The transmission symbol and the error signal (residual echo) are supplied to the echo canceller 702, its output is supplied to a subtractor 706 and subtracted from an output waveform of an A/D converter 701. The output of the subtractor 706 (the waveform obtained by subtracting the echo replica from the received waveform) is supplied to a subtractor 707, and the subtractor 707 subtracts the outputs of the NEXT canceller circuits 703, 704, and 705 from it, outputting the result as an error signal. The NEXT canceller circuits 703, 704, and 705 receive transmission symbol pairs 2, 3, and 4, respectively, and the error signal in common. The NEXT canceller circuits 703, 704, and 705 adaptively control respective tap coefficients according to the LMS algorithm and respectively generate the cross-talk replicas. Note that near-end cross-talk (NEXT) means cross-talk between a signal pair (twisted pair) within the same cable. Echo can be considered to be cross-talk between the same pair (twisted pair).

In recent years, as the transmission speed of transmission system increases, high speed and high accuracy A/D converter is demanded for the receiver device shown in FIG. 2. Increasing the speed of A/D converter means increasing conversion rate (sampling frequency), and in order to realize high accuracy in A/D converter, not only DC characteristics such as resolution, offset, and linearity need to be improved, but also the improvement of dynamic characteristics (A/D converter characteristics) such as reducing sampling clock skew is necessary. The resolution of high-speed A/D converter is relatively coarse, and- it is difficult and expensive for an A/D converter to be high speed and high accuracy. Therefore, in order to realize a high-speed and high-accuracy A/D converter, an architecture in which a plurality of A/D converters are arrayed and each A/D converter operates in a time-interleaved system (called "interleaved A/D converter system" or "time-interleaved A/D converter system") has been conventionally employed (refer to Non-Patent Document 2 for instance). In an interleaved A/D converter system, high-speed operation is achieved while suppressing the increase in the conversion rate of each A/D converter by driving a plurality of A/D converters connected in common to an analog input terminal with multi-phase frequency-divided clock signals having respective phases spaced apart.

FIG. 11 illustrate a model of a noise occurrence caused by phase shift, and is a diagram for schematically explaining how noise caused by the phase sift of sampling clocks between two A/D converters occurs in an interleaved A/D converter system of two A/D converters. In FIG. 11, the abscissa indicates time and the ordinate signal amplitude. Further, in FIG. 11, timings indicated by phase 1 show the sampling phases of the first A/D converter, and phase 2 shows the ideal sampling phases of the second A/D converter when phase 2 is a reference phase. An analog signal in FIG. 11 shows the waveform of a time-continuous analog signal fed to the two A/D converters as an input signal, and intersections of the analog signal waveform and the timings indicated by the phases 1 and 2 show time-discrete sample values (the ideal sample values) of the first and second A/D converters. Further, in FIG. 11, timings indicated by respective arrows (designated by 'phase shift') are the timings at which the sampling phase of the second A/D converter is shifted by the phase shift of the sampling clock. The phase shift of the sampling clock is termed a sampling phase shift.

As shown in FIG. 11, the sampling phase of the second A/D converter is shifted by a sampling phase shift, and as a result, a difference between the sampled value under the condition when a sampling phase shift exists and the ideal sample value (the intersection of the A/D converter 2 and the analog signal) occurs (refer to noise indicated by arrows). Here, when the sampling phase shift is $\Delta t$, the amplitude of the noise $\Delta V$ is given by $\Delta V=[df(t)/dt] \Delta t$ (where f(t) is the time-continuous analog signal waveform), the amplitude depends on the value of the sampling phase shift $\Delta t$, and it increases in the area where the differential coefficient df(t) of the signal waveform variation rate f(t) increases (where the slew rate increases).

In order to cope with such a phase shift, a correction circuit correcting the phase shift is provided in a conventional interleaved A/D converter system (refer to Patent Document 1 for instance).

[Non-Patent Document 1]
Runsheng, et al., "A DSP Based Receiver for 1000BASE-T PHY," IEEE International Solid State Circuits Conference 19-6, 2001.

[Non-Patent Document 2]
Robert Talt, et al., "A 1.8V 1.6 G Sample/s 8-b Self-Calibrating Folding ADC with 7.26 ENOB at Nyquist Frequency," IEEE International Solid State Circuits Conference 14.1, 2004.

[Non-Patent Document 3]
Simon Haykin, trans. Hiroshi Suzuki, et al., "Adaptive Filter Theory," Kagaku Gijutsu Shuppan, 508 p.

[Patent Document 1]
U.S. Pat. No. 6,522,282 B1 FIG. 3

SUMMARY OF THE DISCLOSURE

As described above, in order to achieve high-speed and high-accuracy operation in an interleaved A/D converter system, a correction circuit for correcting the sampling phase shift is necessary. In this case, circuits, processing, and sequences unnecessary to a normal adaptive equalizer of a receiver device in a data transmission system have to be added, and it is very difficult to reduce circuit size and simplify processing.

Further, after correcting the sampling phase shift of A/D converter, echo must be cancelled, increasing circuit scale and costs. Meanwhile, as the demand for high-speed operation increases, supplying sampling clocks whose phase shift have been corrected in advance to a plurality of A/D converters will makes designing difficult.

Accordingly, a canceller device that makes it possible to cancel echo and/or cross-talk when a phase shift occurs in an interleaved A/D converter system without incurring the increases in circuit scale and power consumption is desired.

The outline of the present invention is as follows.

A canceller device according to the present invention comprises a first canceller which compensates sampling phase shift of an interleaved analog-to-digital converter circuit and a second canceller which cancels echo and/or cross-talk from a signal whose sampling phase shift has been compensated.

The canceller device according to the present invention preferably comprises a compensation range selection circuit which determines the compensation range of the first canceller based on the tap coefficients of the second canceller.

Preferably, the canceller device according to the present invention, based on a prescribed training algorithm, carries out cancellation of echo and/or cross-talk from signals output from a plurality of analog-to-digital converter circuits. The analog-to-digital converter circuits have analog input terminals for receiving an analog input signal connected in common and convert said analog input signal into digital signals to output the resultant digital signals, responsive to respective sampling clock signals having respective phase spaced apart. The canceller device comprises: a first canceller for receiving a digital transmission signal and an error signal, outputting a replica of echo and/or cross-talk, and for compensating sampling phase shift of said plurality of analog-to-digital converter circuits; a second canceller for receiving said digital transmission signal and said error signal, and canceling echo and/or cross-talk from signals output from said plurality of analog-to-digital converter circuits, each having sampling phase shift compensated; and a compensation range selection circuit for controlling to select a position of the sampling phase shift subjected to compensation by said first canceller. The compensation range selection circuit estimates a tap position at which the sampling phase shift needs to be compensated based on the tap coefficients of said second canceller after training and selects taps used by said first canceller.

In the present invention, the first canceller and the second canceller may share a part of the circuit.

The meritorious effects of the present invention are summarized as follows.

According to the present invention, it is possible to cancel echo and near-end cross-talk when phase shifting occurs in an interleaved analog-to-digital converter system while suppressing the increases in the circuit scale and power consumption.

Further, according to the present invention, echo and near-end cross-talk are suppressed although the sampling phase shift is allowed to be present, thus the delay design such as timing is simplified.

Still other features and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTIONS OF THE DRAWINGS

PREFERRED EMBODIMENTS OF THE INVENTION

Figure 2:
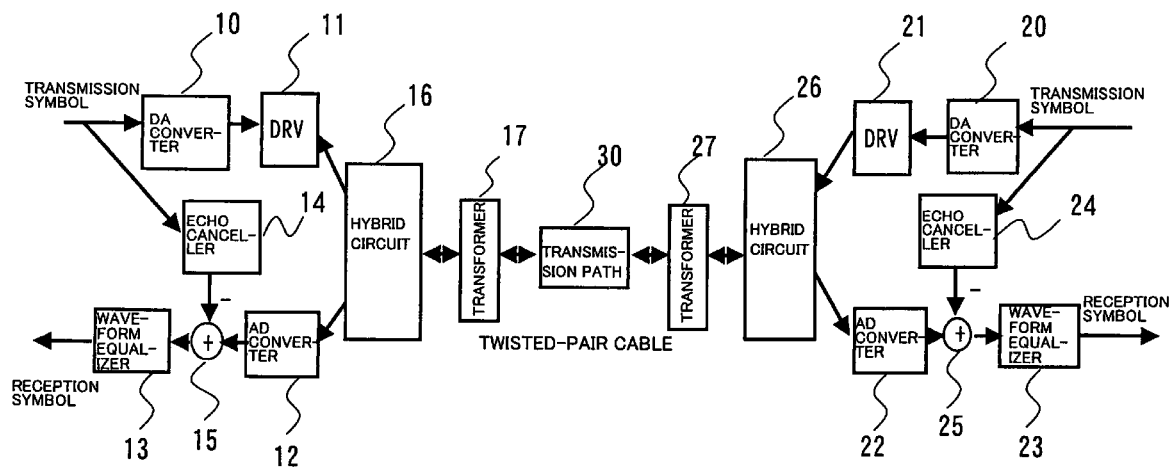
FIG. 2 is a diagram illustrating the configuration of a system to which the present invention is applied.
Figure 9:
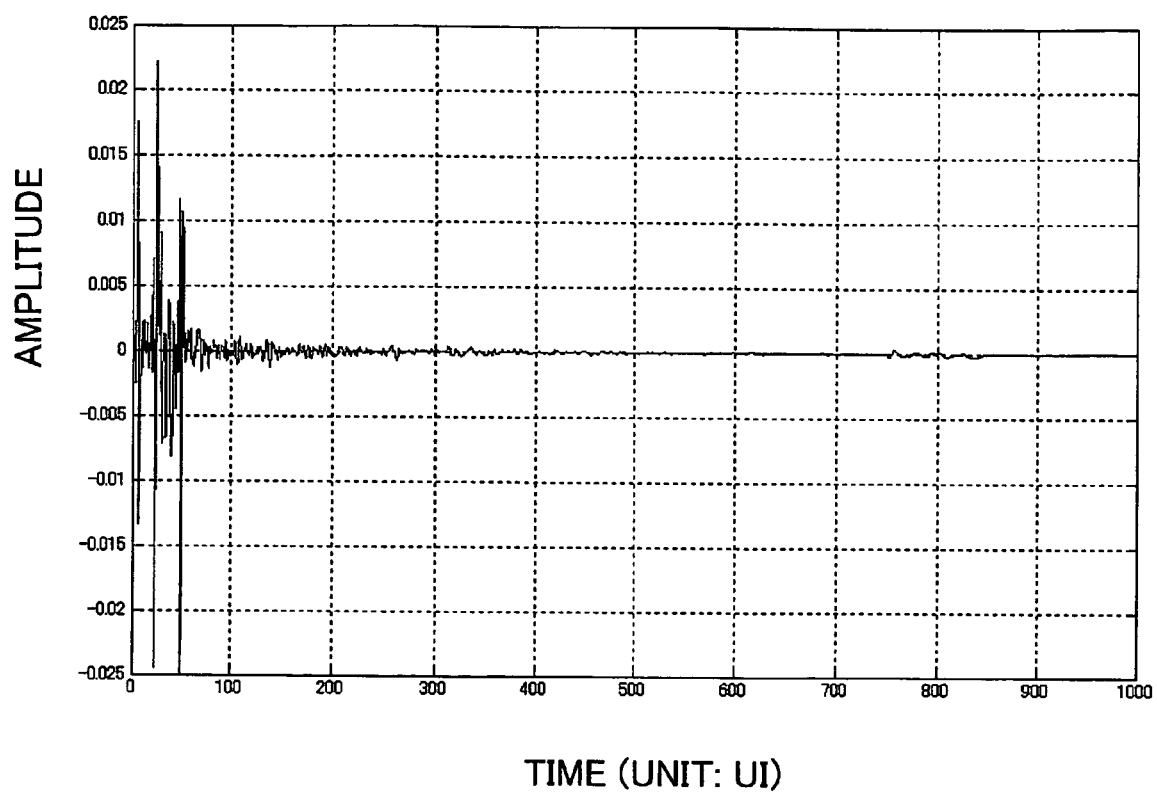
FIG. 9 is a diagram showing an echo response waveform.

Hereinafter, the embodiments of the present invention will be described with reference to the drawings in order to further explain the above-described present invention in detail. First, the principle of the present invention will be explained. FIG. 9 is a diagram showing the response waveform of an echo solitary wave in the data transmission system shown in FIGS. 2 and 3 with the abscissa indicating time (the unit is 1 UI (Unit Interval)) and the ordinate amplitude. In the echo waveform, the tail of the echo remains even after several hundred sample times (several hundred UIs) because of the reflections on the far end side.

Figure 10:
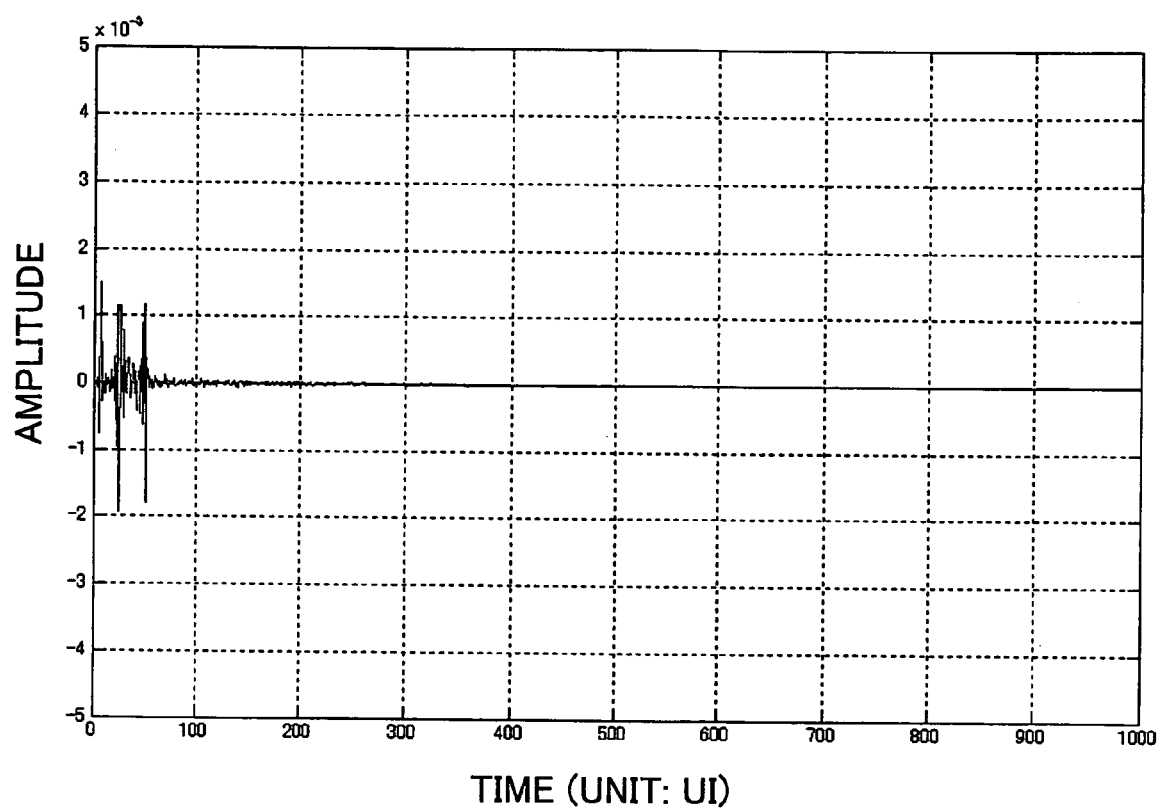
FIG. 10 is a diagram showing a differential waveform of the echo response waveform.
Figure 11:
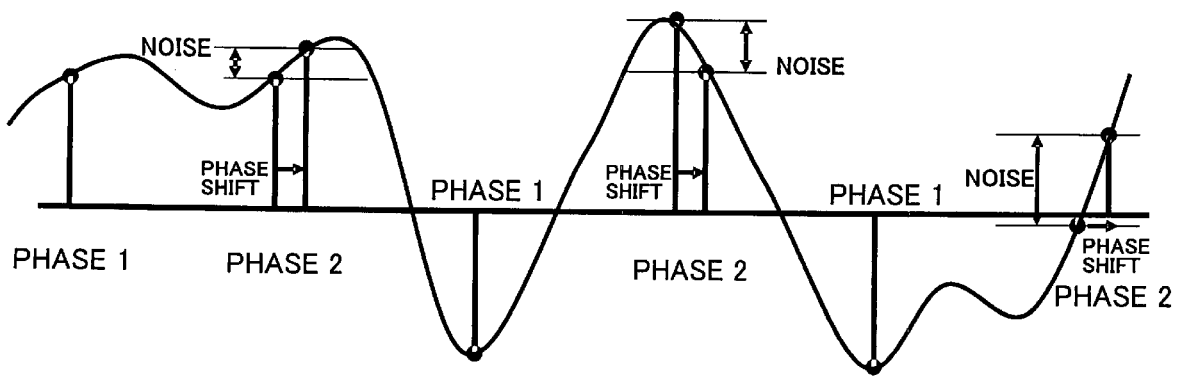
FIG. 11 is a diagram illustrating the relationship between a phase shift and a noise in an interleaved A/D converter system.

FIG. 10 is a diagram showing the waveform obtained by subtracting the response waveform shifted by, for instance, 0.05 UIs from the original response waveform of the echo solitary wave. The abscissa indicates time (the unit is 1 UI (Unit Interval)) and the ordinate amplitude in FIG. 10 as well. As shown in FIG. 10, the influence of the sampling phase shift of the A/D converters can be reduced by compensating only the areas with high amplitudes in the echo solitary wave response (refer to FIG. 9). Further, near-end cross-talk from other wires can be reduced similarly as the echo cancellation.

In a canceller device according to the present invention, which has been invented based on the above observation and knowledge, there is provided a canceller (104 in FIG. 1) which compensates the sampling phase shift of an interleaved A/D converter, and in addition to this canceller for correcting the sampling phase shift (termed a sub canceller), there is provided another canceller (termed a main canceller) (103 in FIG. 1) which suppresses echo and/or cross-talk (referred to as echo/cross-talk hereinafter) after the sampling phase shift has been compensated. The canceller device according to the present invention further comprises a compensation range selection circuit (105 in FIG. 1) which selects a position of the sampling phase shift for being subjected to compensation, and variably controls tap coefficient of the canceller (104 in FIG. 1) for correcting the sampling phase shift by estimating a tap position where the compensation of the sampling phase shift is necessary based on tap coefficients of the canceller (103 in FIG. 1), thereby canceling echo/cross-talk from the signal after the sampling phase shift has been compensated.

Since it is not necessary to provide taps for the canceller (104 in FIG. 1) for correcting the sampling phase shift except for the taps where phase shift compensation is necessary, the number of multipliers and adders for the taps of the canceller (104 in FIG. 1) for correcting the sampling phase shift can be reduced. Further, since echo/cross-talk is suppressed in the main canceller and only the differential is compensated in the subcanceller, the word length for calculation can be reduced.

As a comparison, for instance if taps matching the response length of the echo solitary wave are provided for each of multiple A/D converters constituting an interleaved A/D converter system, the circuit scale will increase.

According to the present invention, even when there is a phase shift of the sampling clock of an A/D converter, the sub canceller (104 in FIG. 1) for compensating the phase shift compensates the phase shift, and the main canceller (103 in FIG. 1) cancels echo/cross-talk after the phase shift has been compensated, thereby suppressing the deterioration of the characteristics even when a sampling phase shift exists. Further, the timing design of the circuit is made easier and high-speed operation can be realized by achieving a design where the existence of the sampling phase shift is allowed. Hereinafter, detailed explanations will be given about the embodiments.

Figure 1:
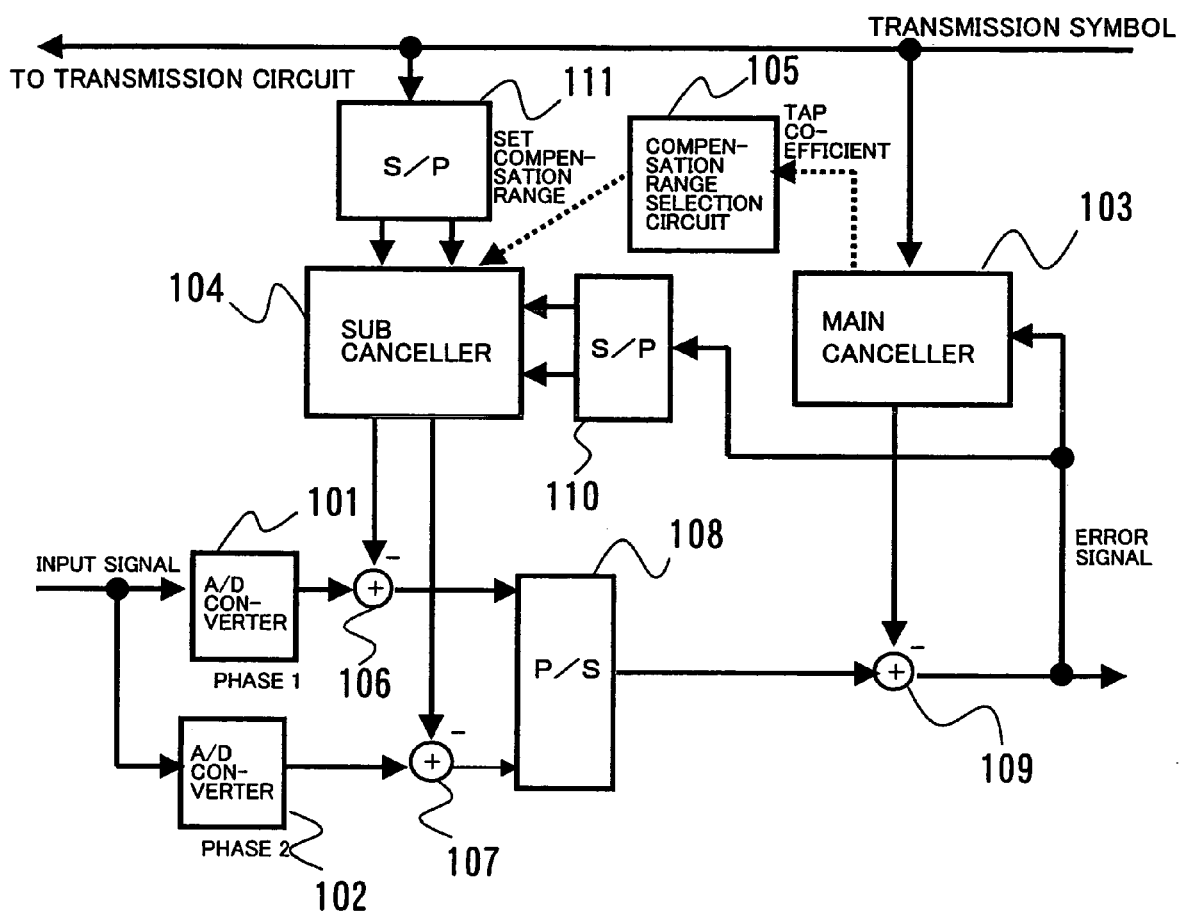
FIG. 1 is a diagram illustrating the configuration of an embodiment of the present invention.
Figure 12:
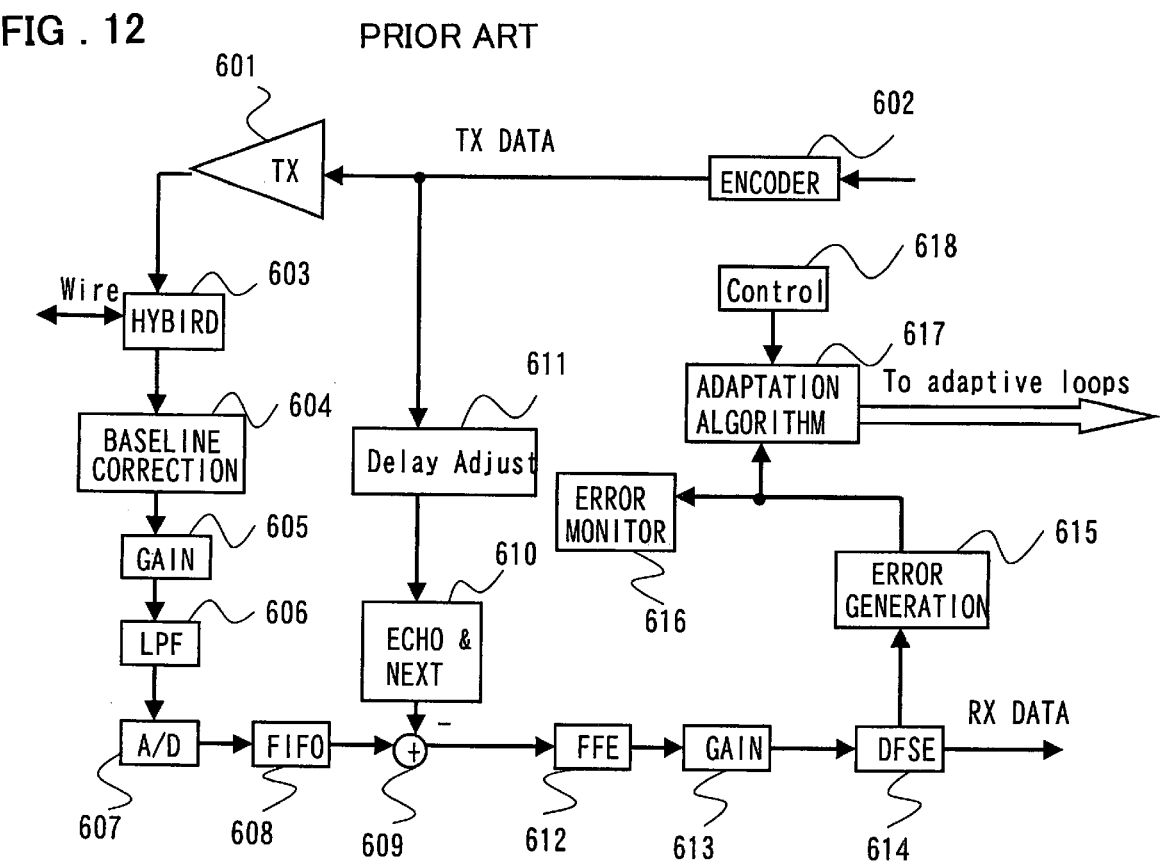
FIG. 12 is a diagram illustrating the configuration of the receiver device described in Non-Patent Document 1.
Figure 13:
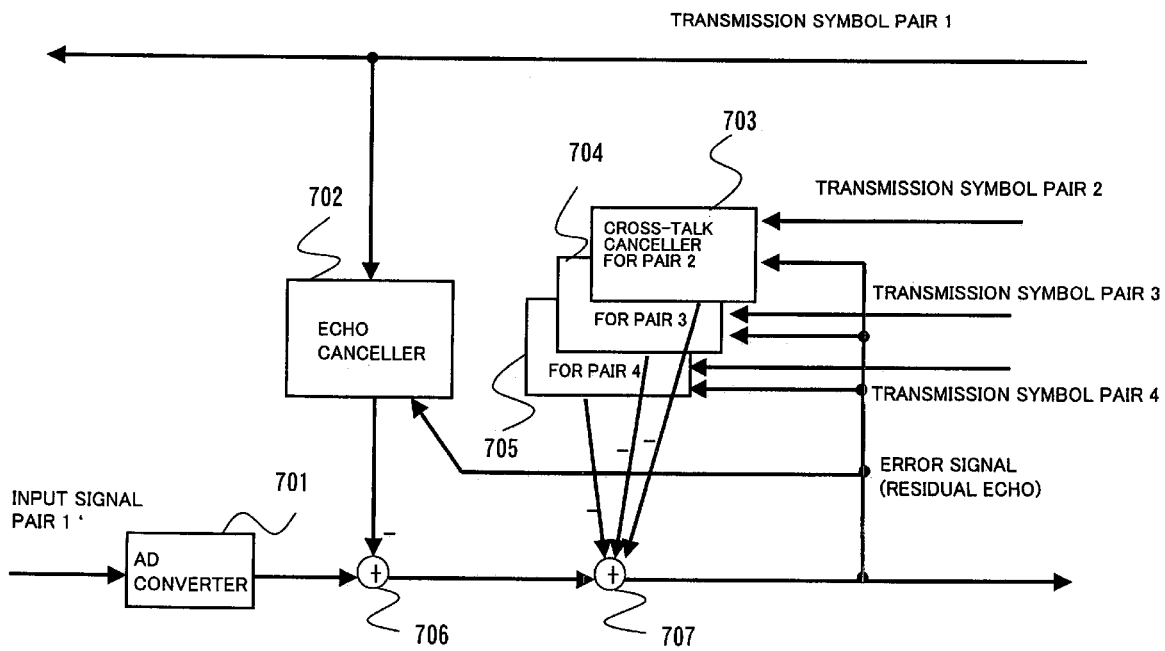
FIG. 13 is a diagram for explaining the configuration of the ECHO & NEXT in FIG. 12.

FIG. 1 is diagram illustrating the configuration of a receiver device of a first embodiment of the present invention, using a signal diagram. Note that the embodiment shown below may be used as the receiver device shown in FIG. 2 or 12.

Referring to FIG. 1, the receiver device according to the present embodiment comprises two A/D converters 101 and 102, a main canceller 103, a sub canceller 104, a compensation range selection circuit 105, subtractors 106 107 and 109, a parallel-to-serial converter circuit (multiplexer) 108, a serial-to-parallel converter circuits (demultiplexers) 110 and 111. The A/D converters 101 and 102, which have analog inputs to which a received analog signal is supplied, convert the received analog signal into digital signals and output the digital signal responding to sampling clock signals (not shown) of different phases to each other, respectively. The main canceller 103 cancels echo/near-end cross-talk (NEXT) from the received signal. The subcanceller 104 corrects sampling phase shifts of A/D converters 101 and 102. The subtractors 106 and 107 that subtract the output (replica) of the subcanceller 104 from the digital signals output from the two A/D converters 101 and 102, respectively. The parallel-to-serial converter circuit (multiplexer) 108 receives and multiplexes the outputs of the subtractors 106 and 107 to output the multiplexed signal. The subtractor 109 subtracts the output (replica) of the main canceller 103 from the multiplexed output of the parallel-to-serial converter circuit 108.

The main canceller 103 includes an adaptive filter which receives an error signal output from the subtractor 109 and a transmission symbol (digital transmission signal) and carries out cancellation of echo/near-end cross-talk (NEXT). The main canceller 103 cancels echo/near-end cross-talk (NEXT) of the signals output from the A/D converters 101 and 102, whose sampling phase shifts have been compensated.

The error signal is demultiplexed into two signals by the serial-to-parallel converter circuit (demultiplexer) 110, and supplied to the subcanceller 104. The compensation range selection circuit 105 selects a range of a sampling phase shift in the subcanceller 104 based on tap coefficients of the main canceller 103.

The serial-to-parallel converter circuit 111 which has an input terminal for receiving the transmission symbol, and which demultiplexes the transmission symbol and outputs the demultiplexed transmission symbols in parallel. The subcanceller 104 includes an adaptive filter which variably controls taps under the control of the compensation range selection circuit 105. The subcanceller 104 receives the demultiplexed transmission symbols from the serial-to-parallel converter circuit 111 and the demultiplexed error signals output from the serial-to-parallel converter circuit 110, and outputs replicas of echo/near-end cross-talk to the subtractors 106 and 107 respectively.

The subtractors 106 and 107 subtract two outputs of the subcanceller 104 from the outputs of the A/D converters 101 and 102, respectively, and output received signals, from which sampling phase shifts of the A/D converters 101 and 102 have been corrected. This follows the principle of the present invention described with reference to FIGS. 9 and 10. And the main canceller 103 cancels echo/near-end cross-talk from the received signals (i.e., the outputs of the subtractors 106 and 107), whose sampling phase shifts have been corrected.

Figure 3:
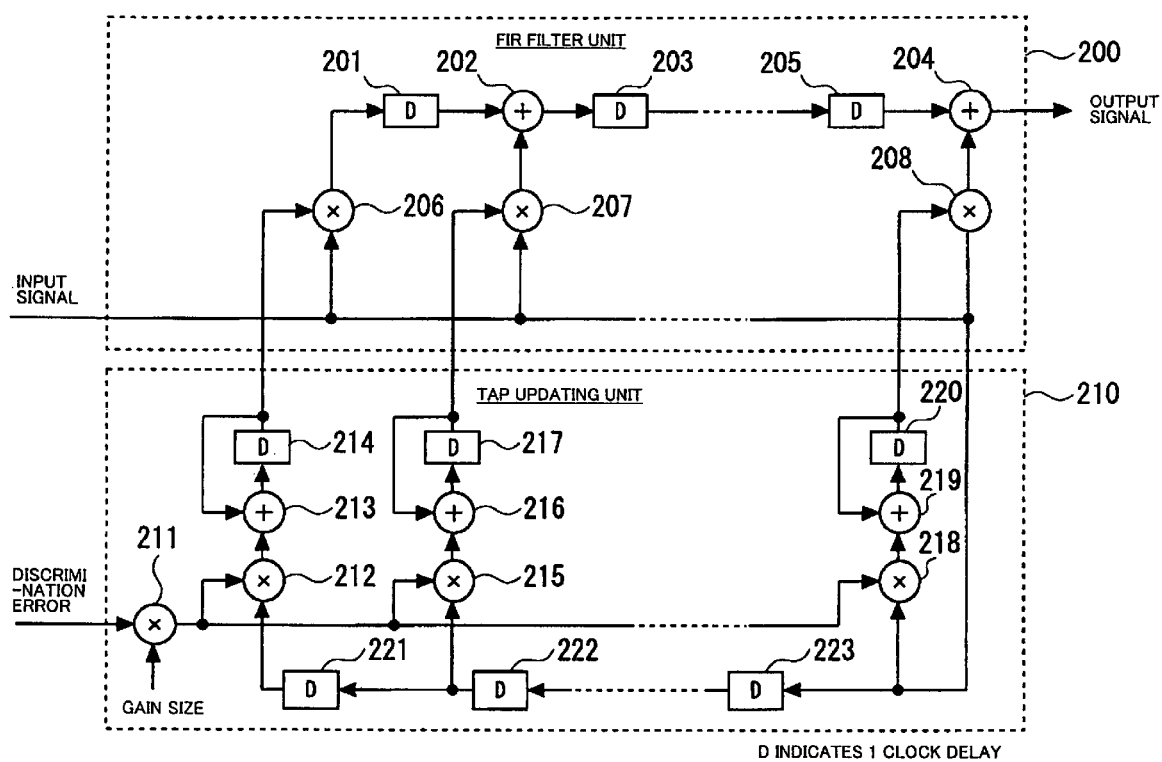
FIG. 3 is a diagram illustrating the configuration of an adaptive filter (equalizer) of an embodiment of the present invention.

FIG. 3 is a diagram illustrating an example of the configuration of the main canceller 103 shown in FIG. 1. Referring to FIG. 3, the adaptive equalizer is constituted as an adaptive filter comprising: a filter unit 200 which is composed by an FIR (Finite Impulse Response) filter; and a tap updating unit 210 which updates the filter coefficient of the FIR filter unit 200. The adaptive filter shown in FIG. 3 adopts, for example, the LMS (Least Mean Square) algorithm. By the way, the algorithm in the present invention is as a matter of course is not limited to the LMS. Assuming that the degree of the filter is M, the following equation is given:

$$y_n = b_{0,n} x_n + b_{1,n} x_{n-1} + \ldots + b_{M,n} x_{n-M} \quad (1)$$

where $x_n$ and $y_n$ are an input signal (discrete-time digital signal) and an output signal, respectively, $e_n$ is a discrimination error, and $b_{0,n}, b_{1,n}, \ldots b_{M,n}$ indicate filter coefficients 208 to 206 at the time n.

Note that $x_{n-1}$ is a signal obtained by having a delay element delay the input signal by one unit time, and $x_{n-M}$ is a signal obtained by having M number of delay elements delay the input signal by M unit time.

The Equation (1) is represented as follows:

$$y_n = B_n^T X_n \quad (2)$$

where $B_n$ is a vector defined as $B_n = \text{Col}[b_{0,n}, b_{1,n}, \ldots, b_{N,n}]$, T is a transpose operator, and $X_n$ is a vector defined as $X_n = \text{Col}[x_n, x_{n-1}, \ldots, x_{n-M}]$ (where Col is an operator that sets a row to a column (a vector)).

According to the well-known LMS algorithm by B. Widrow for tap updating, the filter coefficient $B_{n+1}$ of $\text{time}_{n+1}$ is given by the following equation:

$$B_{n+1} = B_n + v e_n X_n \quad (3).$$

In other words, in FIG. 3, while the tap updating unit 210 supplies $B_n$ of the current time n to multipliers 208 to 206, the tap updating unit 210 also stores $B_n$ in memory elements (D registers) 220, . . . , 217, and 214, and updates the filter coefficient vector at the following time n+1 to $B_{n+1} = [b_{0,n+1}, b_{1, n+1}, \ldots, b_{N, n+1}]$. $B_{n+1}$ is obtained by having adders 219, . . . , 216, and 213 respectively add the values output from multipliers 218, . . . , 215, and 212, which multiply $X_n = \text{Col}[x_n, x_{n-1}, \ldots, x_{n-M}]$ by a gain v and the error $e_n$, and the values of the memory elements (D registers) 220, . . . , 217, and 214 $B_n = [b_{0,n}, b_{1,n}, \ldots, b_{N,n}]$. This LMS algorithm gradually gets closer to the optimum tap gain. Note that the filter coefficients may also be variably controlled according to the RLS (Recursive Least Squares) algorithm. Further, an example using an FIR filter having a linear phase characteristic has been described in FIG. 3 for the sake of simplicity, however, an adaptive filter is not limited to the FIR filter. Further, as an adaptive equalizer, a time domain equalizer has been described as an example, however, an equalizer adaptively equalizing in the frequency domain can be applied as well (refer to Non-Patent Document 3 for instance). Since a convolution in the time domain (refer to Equation (1)) correspond to a multiplication in the frequency domain, a structure where the adaptive equalization is carried out in the frequency domain is suitable for high-speed operation.

Figure 4:
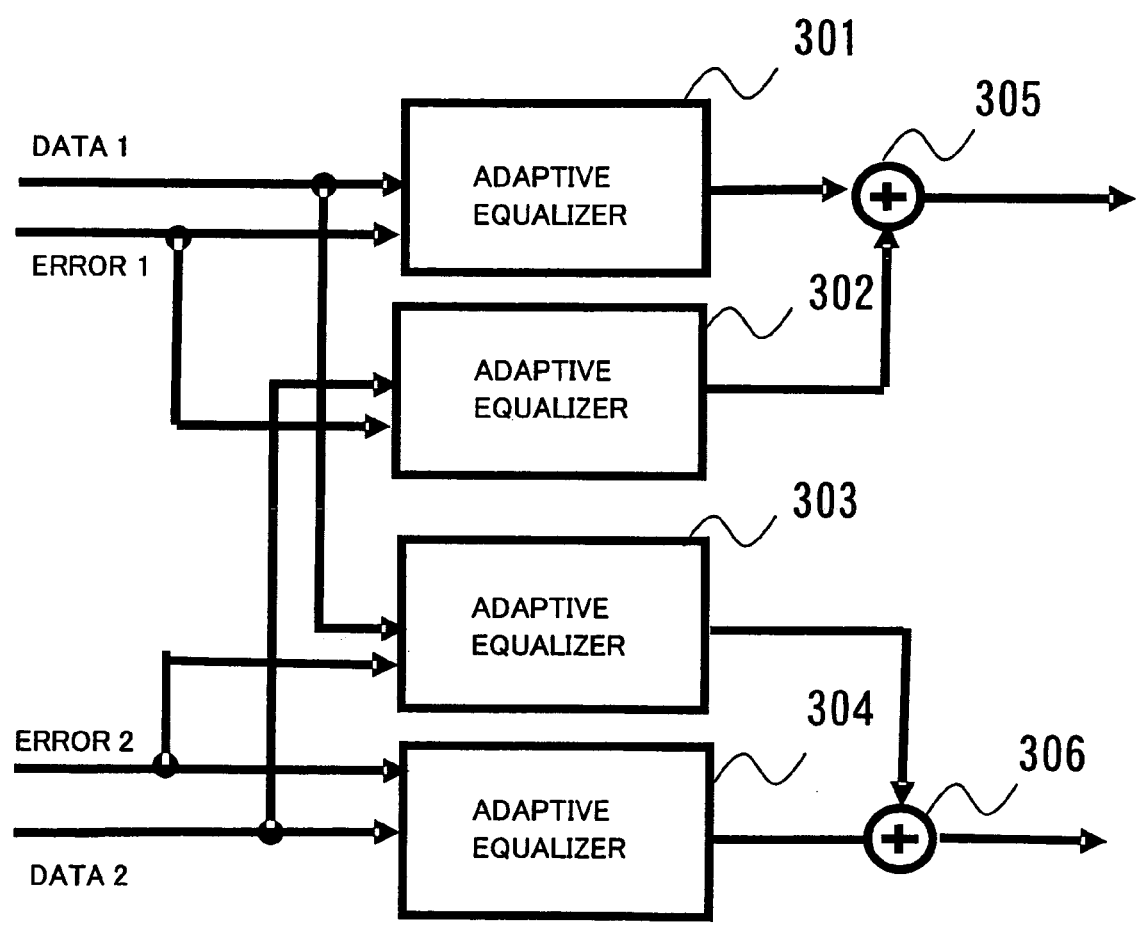
FIG. 4 is a diagram illustrating the configuration of a sub-canceller according to the present invention.

FIG. 4 is a diagram showing an example of the configuration of the subcanceller 104 shown in FIG. 1. It is not limited to this, but the subcanceller 104 is constituted by MIMO (Multiple Inputs, and Multiple Outputs) filters in the example shown in FIG. 4. The subcanceller 104 comprises first to fourth adaptive equalizers 301-304 and adders 305 and 306. The first adaptive equalizers 301 receives data 1 which is the result of serial-to-parallel conversion by the serial-to-parallel converter circuit 111 in FIG. 1 and an error signal 1 which is the result of serial-to-parallel conversion by the serial-to-parallel converter circuit 110 in FIG. 1. The second adaptive equalizers 302 receives data 2 which is the result of serial-to-parallel converted by the serial-to-parallel converter circuit 111 in FIG. 1 and the error signal 1. The adder 305 adds the outputs of first and second adaptive equalizer 301 and 302 and supplies the added result to the first subtractor 106 in FIG. 1. The third adaptive equalizers 303 receives the data 1 and an error signal 2 which is the result of serial-to-parallel conversion by the serial-to-parallel converter circuit 110 in FIG. 1. The forth adaptive equalizers 304 receives the data 2 and the error signal 1. The adder 306 add the outputs of the third and fourth adaptive equalizers 303 and 304 and supplies the added result to the first subtractor 107 in FIG. 1. Each of the adaptive equalizers may be composed by for an adaptive filter (FIR filter for instance) shown in FIG. 3.

Referring to FIG. 1 again, the compensation range selection circuit 105 receives the tap coefficients (the values of the D registers 214 to 220 in FIG. 3) of the main canceller 103, and calculates a tap position for correcting the phase shift in the subcanceller 104.

In the present embodiment, the following technique can be used to carry out training of each tap coefficient in respective filters of the main canceller 103 and sub canceller 104:

(A1) Train the tap coefficient of the main canceller 103. (The training of the tap coefficient is continuous.)

(A2) A tap position of the subcanceller 104 for compensating the phase shift is determined by the value of the tap coefficient of the main canceller 103.

(A3) The tap coefficient of the subcanceller 104 is trained.

(A4) In case the compensation range of the subcanceller 104 is not variable, each tap coefficient of the subcanceller 104 and the main canceller 103 may be trained simultaneously.

Figure 5:
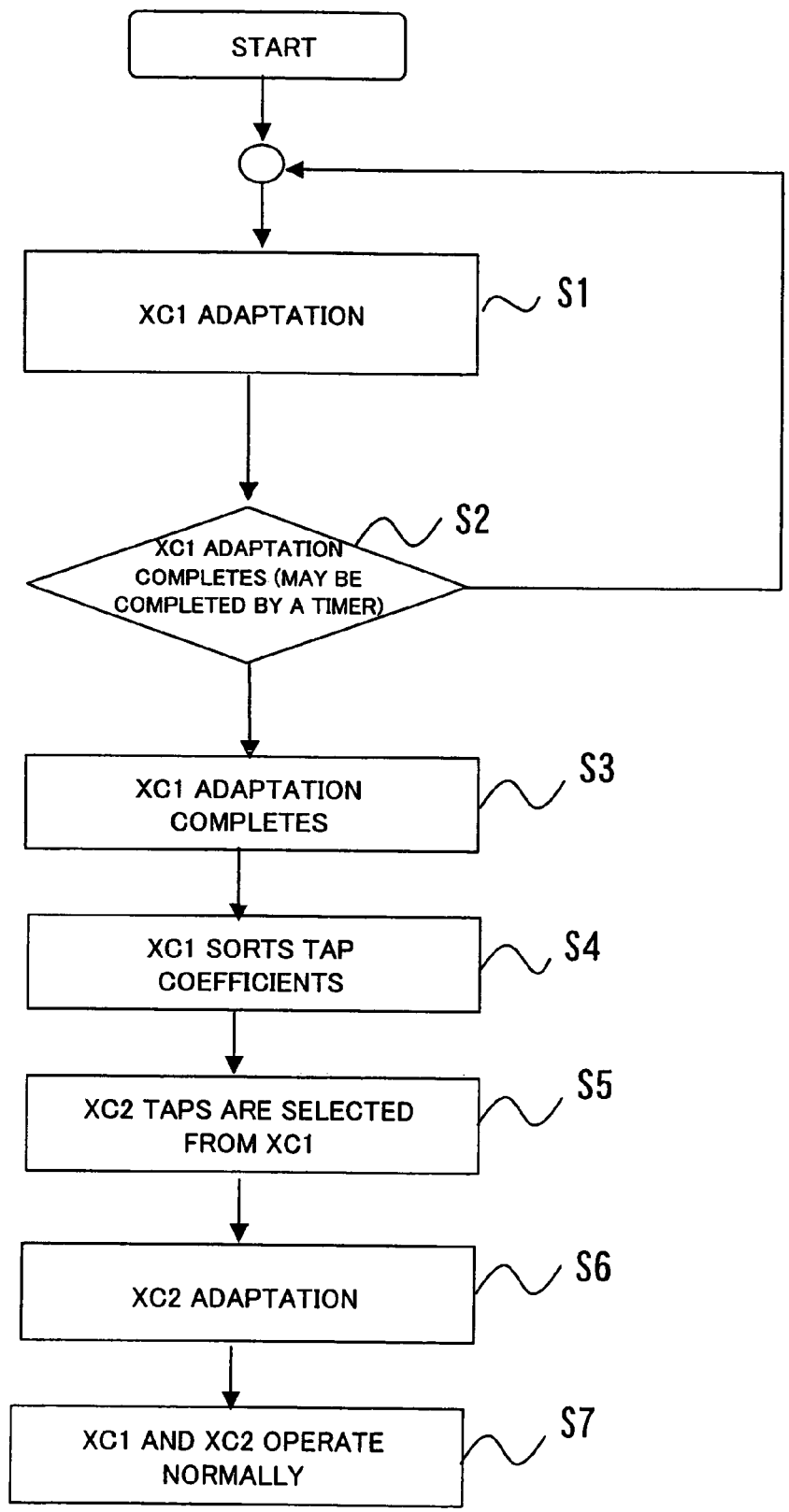
FIG. 5 is a flowchart illustrating the processing of a compensation range selection circuit of an embodiment of the present invention.

FIG. 5 is a diagram showing how the compensation range selection circuit 105 sets the compensation range of the subcanceller 104 which is for correcting sampling phase shift of A/D converters 101 and 102.

First, the adaptation of the main canceller 103 (XC1) is performed (a step S1). Next, whether or not the adaptation is complete is determined (a step S2). At this time of the determination, it is not necessary to stop the adaptation. The completion of the adaptation may also be determined by a timer in such a manner that when a timeout of the timer occurs, the adaptation is regarded to be completed.

At the completion of the main canceller 103 (XC1) adaptation (a step S3), the tap coefficients (the D registers 214 to 220 in FIG. 3) of the main canceller 103 (XC1) are sorted in, for instance, in descending order (a step S4), and as many taps as the provided tap coefficients of the subcanceller 104 (XC2) are selected in descending order (a step S5).

Next, the adaptation of the subcanceller 104 (XC2) is performed (a step S6), and then the main canceller 103 (XC1) and the subcanceller 104 (XC2) operate normally (a step S7).

Figure 6:
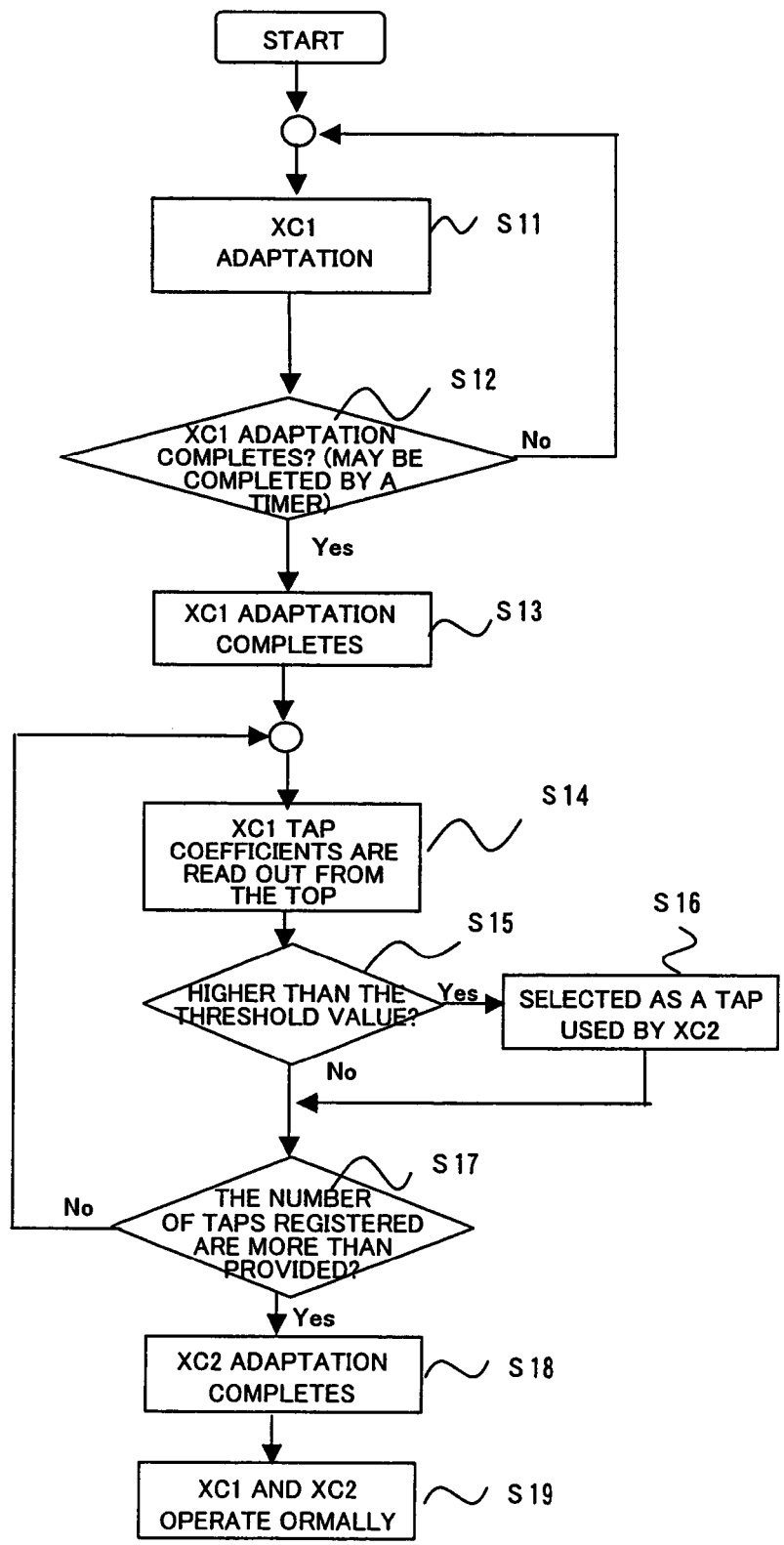
FIG. 6 is a flowchart illustrating the processing of a compensation range selection circuit of an embodiment of the present invention.

Or after the completion of the adaptation of the main canceller 103, the tap coefficients (the D registers 214 to 220 in FIG. 3) of the main canceller 103 may be searched from the top and compared with a predetermined threshold value, assigning the taps higher than the threshold value as the taps of the subcanceller 104 (XC2). FIG. 6 is a flowchart illustrating these procedures. In FIG. 6, steps S11, S12, and S13 are the same as the steps SI, S2, and S3 in FIG. 5.

When the adaptation of the main canceller 103 is completed, the tap coefficients (the D registers 214 to 220 in FIG. 3) of the main canceller 103 are read out from the top (a step S14), the tap coefficients read out are compared with the threshold value (a step S15), and the tap coefficients higher the threshold value (Yes branch of the step S15) are selected as the tap coefficients used by the subcanceller (XC2) 104 (a step S16).

If the number of the tap coefficients used is more than the tap coefficients provided for the subcanceller (XC2) 104 (Yes branch of a step S17), the adaptation of the subcanceller (XC2) 104 is performed (a step S18). After this, the main canceller (XC1) 103 and the subcanceller (XC2) 104 operate normally (a step S19).

Next, another embodiment of the present invention will be described. The signal diagram of the present embodiment is the same as the one shown in FIG. 1. In the present embodiment, the main canceller 103 and the subcanceller 104 in FIG. 1 share a part of the circuit.

Figure 7:
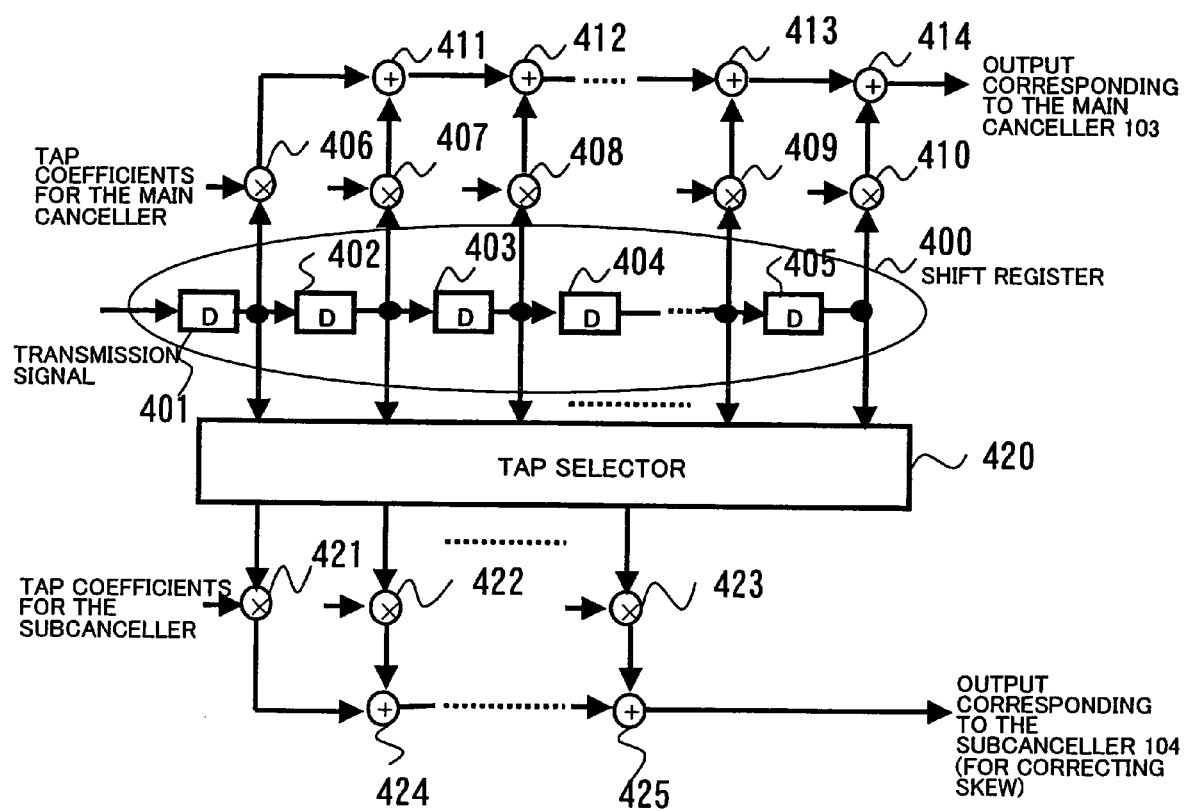
FIG. 7 is a diagram illustrating the structures of a main canceller and a subcanceller of an embodiment of the present invention.

FIG. 7 is a diagram illustrating the configuration of the present embodiment, and the structures of the main canceller 103, the subcanceller 104, and the compensation range selection circuit 105 are shown. Referring to FIG. 7, a shift register (delay circuit array) 400 made up of plurality of delay circuits 401 to 405, plurality of multipliers 406 to 410 respectively multiplying the outputs of the delay circuits 401 to 405 by tap coefficients received, and an FIR filter made up of plurality of adders 411 to 414 constitute the main canceller 103 in FIG. 1. Further, plurality of multipliers 421 to 423 respectively multiplying the outputs of delay circuits selected by a tap selector 420 from the shift register (delay circuit array) 400 made up of plurality of delay circuits 401 to 405 by tap coefficients received, and an FIR filter made up of plurality of adders 424 and 425 constitute the subcanceller 104 for correcting phase shift. The main canceller 103 and the subcanceller 104 share the shift register (delay circuit array) 400 that constitutes their FIR filters. The tap selector 420 constitutes the compensation range selection circuit 105 in FIG. 1 and selects taps for the subcanceller 104 according to the procedures described referring to FIG. 5 or 6. The tap selector 420 selects the taps used by the subcanceller 104 based on the tap coefficients after the completion of the adaptation of the main canceller 103. As a concrete example, regarding the multipliers 421 to 423, no multiplier is assigned to unused taps; the multipliers are assigned to used taps only.

Figure 8:
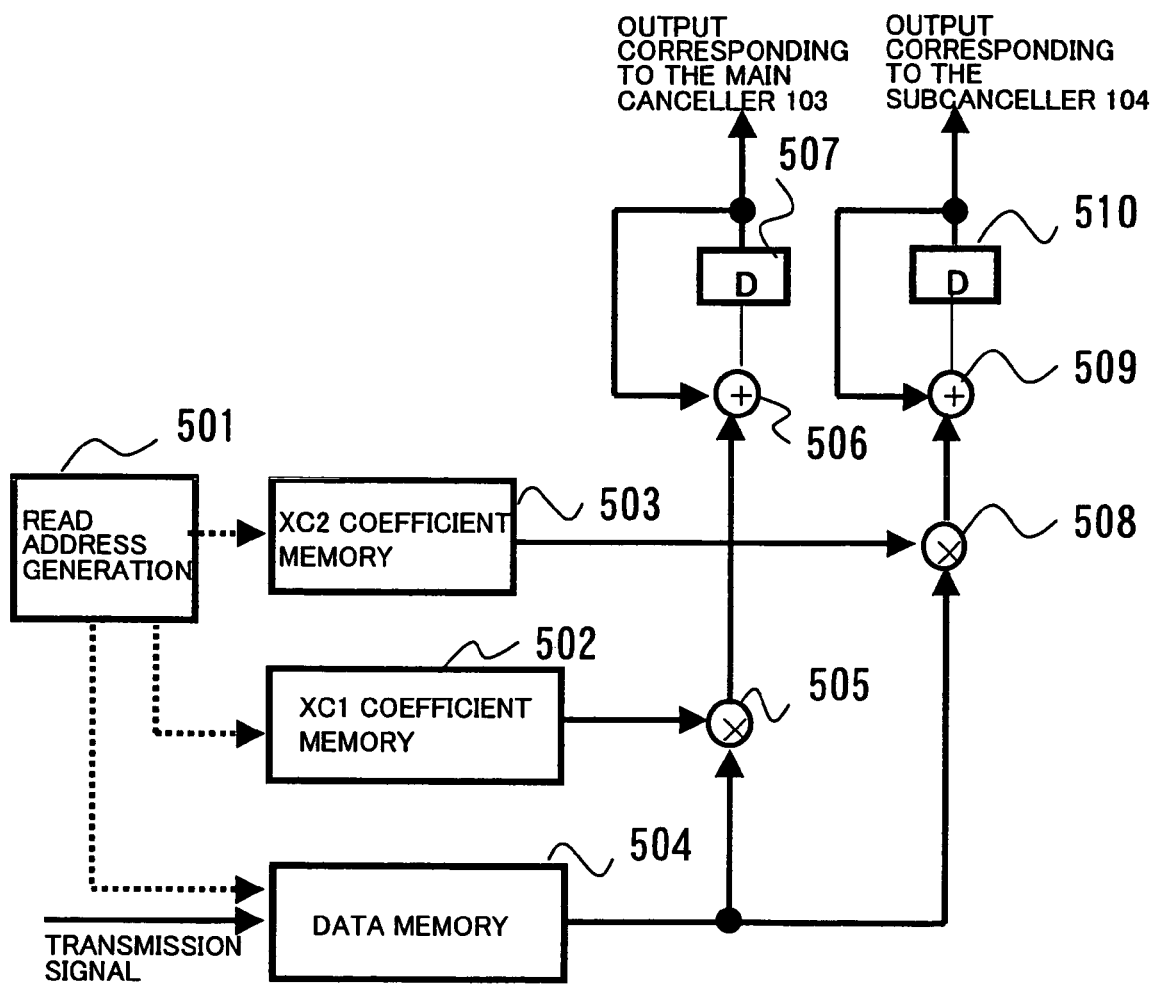
FIG. 8 is a diagram illustrating the structures of a main canceller and a subcanceller of an embodiment of the present invention.

FIG. 8 is a diagram illustrating the configuration of yet another embodiment of the present invention, in which a part of the circuits of the main canceller 103 and the subcanceller 104 is shared. In the present embodiment, adaptive filters are realized by memories and a DSP (digital signal processor); the canceller 103 and the subcanceller 104 in FIG. 1 are constituted by memories and accumulators (multiply and add calculators), and the canceller 103 and subcanceller 104 share data memory. In the present embodiment, the canceller 103 and the subcanceller 104 are realized, by for instance, a DSP and the control software thereof.

Referring to FIG. 8, the main canceller 103 in FIG. 1 is comprises a memory (termed "XC1 coefficient memory") 502 for storing the tap coefficients of the main canceller 103, a multiplier 505 for multiplying the tap coefficients read out from the XC1 coefficient memory 502 by transmission data read out from data memory 504, and an accumulator (constituted by a adder 506 and a delay circuit (D register) 507) for accumulating the output of the multiplier 505. Further, the subcanceller 104 in FIG. 1 comprises a memory (termed "XC2 coefficient memory") 503 for storing the tap coefficients of the subcanceller 104, a multiplier 508 for multiplying the tap coefficients read out from the XC2 coefficient memory 503 by the transmission data read out from data memory 504, and an accumulator (constituted by a adder 509 and a delay circuit (D register) 510) for accumulating the output of the multiplier 508. Further, a read address generator 501 which generates readout addresses of the XC1 coefficient memory 502 and the XC2 coefficient memory 503 and a readout address of the data memory 504 is provided. In the present embodiment, the XC2 coefficient memory 503 outputs the value zero to the multiplier 508 for the taps that the compensation range selection circuit 105 did not select to be used by the subcanceller 104.

According to the present embodiment described above, even when the phase shift is present in the sampling phase in an A/D converter, echo/cross-talk can be reduced by generating a replica signal of echo/near-end cross-talk for every interleaved sampling phase. As described with reference to FIGS. 9 and 10, for instance, the influence of phase shifting can be suppressed by compensating only the areas with high amplitudes in the response waveform of the echo solitary wave. According to the present embodiment, echo/cross-talk can be compensated on the top of compensating phase shift in the structure where the tap coefficients of the subcanceller 104 for correcting phase shift are controlled by having the compensation range selection circuit 105 estimate the tap position where the phase shift needs to be compensated based on the tap coefficients of the main canceller 103 reducing echo/cross-talk after phase shift has been compensated. Further, the number of the taps and the adders in the subcanceller 104 can be reduced, decreasing the circuit scale and power dissipation.

Further, according to a system to which the present invention is applied, the present invention can be optionally utilized as the following devices:

a canceller device that only cancels echo as a noise signal that should be removed from a received signal a canceller device that only cancels cross-talk as a noise signal that should be removed from a received signal a canceller device that cancels echo and cross-talk as noise signals that should be removed from a received signal.

The present invention has been illustrated using the above-described embodiments, however, it is to be understood that the present invention is not limited to the structures of the above-mentioned embodiments and covers various modifications and revisions in accordance with the principles of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A canceller device for canceling echo and/or cross-talk from a signal output from an interleaved analog-to-digital converter circuit, said canceller device comprising:

a first canceller for compensating a sampling phase shift of said interleaved analog-to-digital converter circuit; and a second canceller for canceling echo and/or cross-talk from the signal, output from an interleaved analog-to-digital converter circuit, whose sampling phase shift has been compensated.

2. The canceller device according to claim 1, further comprising a compensation range selection circuit for determining a compensation range of said first canceller based on the tap coefficients of said second canceller.

3. The canceller device according to claim 1, wherein said first canceller and said second canceller share a part of the respective circuits.

4. The canceller device according to claim 3, wherein said first and second cancellers comprises first and second adaptive filters respectively, said first and second adaptive filters sharing a delay circuit array for delaying data.

5. The canceller device according to claim 3, wherein said first and second cancellers comprises first and second adaptive filters respectively, said first and second adaptive filters, composed by a digital signal processor, sharing a data memory for delaying data.

6. A canceller device that, based on a prescribed training algorithm, carries out cancellation of echo and/or cross-talk from signals output from a plurality of analog-to-digital converter circuits, said plurality of analog-to-digital converter circuits having input terminals for receiving an analog input signal connected in common and converting said analog input signal into digital signals to output the resultant digital signals, responsive to respective sampling clock signals having respective phase spaced apart, said canceller device comprising:

a first canceller for receiving a digital transmission signal and an error signal, outputting a replica of echo and/or cross-talk, and for compensating a sampling phase shift of said plurality of analog-to-digital converter circuits;

a second canceller for receiving said digital transmission signal and said error signal, and canceling echo and/or cross-talk from signals, output from said plurality of analog-to-digital converter circuits, each of said signals having the sampling phase shift compensated; and a compensation range selection circuit for controlling to select a position of the sampling phase shift for being subjected to compensation by said first canceller; wherein said compensation range selection circuit estimates a tap position at which the sampling phase shift needs to be compensated based on tap coefficients of said second canceller after training, and selects taps used by said first canceller.

7. The canceller device according to claim 6, further comprising:

a first group of subtractors for subtracting a plurality of outputs of said first canceller from outputs of said plurality of analog-to-digital converter circuits, respectively;

a multiplexer circuit for multiplexing a plurality of outputs of said first group of subtractors and outputting the resultant signal; and a second subtractor subtracting an output of said second canceller from the output of said multiplexer circuit; wherein an output of said second subtractor is supplied to said first and second cancellers as said error signal.

8. The canceller device according to claim 7, wherein said first canceller comprises an adaptive MIMO (Multiple Inputs, Multiple Outputs) filter for receiving a plurality of error signals associated with the outputs of said plurality of analog-to-digital converter circuits, generating respective replicas from said plurality of error signals and said digital transmission signal, and for supplying the respective replicas generated to said first group of subtractors.

9. The canceller device according to claim 6, wherein said compensation range selection circuit sorts the tap coefficient values of said second canceller and selects as many taps as tap coefficients provided in said first canceller in descending order.

10. The canceller device according to claim 6, wherein said compensation range selection circuit compares the tap coefficient values of said second canceller with a predetermined threshold value and selects taps of said first canceller corresponding to taps higher than said threshold value.

11. The canceller device according to claim 6, wherein said first canceller and said second canceller comprises adaptive filters respectively, said adaptive filters sharing a delay circuit array for delaying data.

12. The canceller device according to claim 6, wherein the taps selected by said compensation range selection circuit are assigned to a plurality of taps provided in said first adaptive filter in advance.

13. The canceller device according to claim 6, further comprising:
    data memory for temporarily accumulating said transmission signal, delaying said transmission signal, and for outputting the transmission signal delayed;
    first and second coefficient memory, each storing the tap coefficients of said first and second cancellers;
    a read address generator circuit for generating read addresses of said first and second coefficient memory and said data memory;
    first and second multipliers multiplying an output of said data memory by outputs of said first and second coefficient memory, respectively; and
    said first and second accumulators accumulating outputs of said first and second multipliers, respectively;
    wherein said first and said second cancellers comprise first and second adaptive filters respectively, said first and second adaptive filters sharing said data memory.

14. The canceller device according to claim 13, wherein the value zero as a tap coefficient corresponding to an unselected tap is output from said second coefficient memory to said second multiplier in said second adaptive filter.

15. A canceller device for canceling a noise from a signal output from an interleaved analog-to-digital converter circuit, said canceller device comprising:
    a first canceller for compensating a sampling phase shift of said interleaved analog-to-digital converter circuit; and
    a second canceller for canceling the noise from the signal, output from an interleaved analog-to-digital converter circuit, whose sampling phase shift has been compensated.

16. A receiver device of a data transmission system that allows full-duplex communication, said receiver device comprising the canceller device as set fourth in claim 1.

17. A receiver device comprising:
    a plurality of analog-to-digital converter circuits having input terminals for receiving an analog input signal connected in common and converting said analog input signal into digital signals to output the resultant digital signals, responsive to respective sampling clock signals having respective phase spaced apart; and
    the canceller device, as set fourth in claim 6, for carrying out cancellation of echo and/or cross-talk from signals output from said plurality of analog-to-digital converter circuits.

18. A data transmission system including a receiver device that comprises the canceller device as set fourth in claim 1.

* * * * *